United States Patent
O'Connell

(10) Patent No.: US 6,837,534 B2
(45) Date of Patent: Jan. 4, 2005

(54) FRONT GRILLE GUARD FOR VEHICLE

(75) Inventor: David O'Connell, Huntington Beach, CA (US)

(73) Assignee: Mitsubishi Jidosha Kogyo Kabushiki Kaisha (JP)

(*) Notice: Subject to any disclaimer, the term of this patent is extended or adjusted under 35 U.S.C. 154(b) by 0 days.

(21) Appl. No.: 10/338,030

(22) Filed: Jan. 7, 2003

(65) Prior Publication Data

US 2004/0130168 A1 Jul. 8, 2004

(51) Int. Cl.⁷ .............................................. B60R 19/52
(52) U.S. Cl. ..................................... 296/115; 180/68.6
(58) Field of Search ................................. 293/115, 143, 293/114; 180/68.6; D12/170, 171; 160/DIG. 1

(56) References Cited

U.S. PATENT DOCUMENTS

| | | | | |
|---|---|---|---|---|
| 1,791,841 A | * | 2/1931 | Radford | 180/68.6 |
| D153,266 S | * | 4/1949 | Darrin | 293/115 |
| 2,650,849 A | * | 9/1953 | Poncher et al. | 293/115 |
| 4,322,106 A | * | 3/1982 | Nespor | 296/121 |
| 4,671,552 A | * | 6/1987 | Anderson et al. | 293/144 |
| 5,205,597 A | * | 4/1993 | Chase | 180/68.6 |

* cited by examiner

*Primary Examiner*—Dennis H. Pedder
(74) *Attorney, Agent, or Firm*—Rossi & Associates

(57) ABSTRACT

There is provided a front grille guard for a vehicle, which is comprised of first and second grille guards attached independently of each other adjacent to a logo attachment part provided on the front face of the vehicle. Therefore, it is possible to attach the front grille guard to a vehicle body without deteriorating the visibility of the logo attachment part.

9 Claims, 5 Drawing Sheets

FRONT GRILLE GUARD FOR VEHICLE

BACKGROUND OF THE INVENTION (1) Field of the Invention

The present invention relates to a front grille guard for a vehicle.

(2) Description of the Related Art

U.S. Pat. Nos. 5,366,264 and 6,022,057 disclose conventional types of grille guards for vehicles. Known front grille guards are constructed such that they protrude considerably forward in the direction of the length of the vehicles or are constructed such that they completely cover the front faces of the vehicles. Therefore, the known front grille guards have the problem of reducing the visibility of logos or the like attached to the front faces of the vehicles.

It would therefore be desirable to provide a front grille guard that does not reduce the visibility of a logo or the like when the front grille guard is attached to a vehicle.

SUMMARY OF THE INVENTION

The present invention provides a front grille guard comprising: a logo attachment part provided at substantially a center of a front face of the vehicle; and grille guards formed along the front face of the vehicle and mounted independently of each other at right and left across said logo attachment part on the front face of the vehicle.

BRIEF DESCRIPTION OF DRAWINGS

The nature of this invention, as well as other subjects and advantages thereof, will be explained in greater detail with reference to certain preferred embodiments and to the accompanying drawings, in which like reference character designate the same or similar parts throughout the figures, wherein.

DETAILED DESCRIPTION OF THE PREFERRED EMBODIMENTS

The present invention will now be described in detail with reference to the drawings showing a preferred embodiment thereof.

Figure 1:
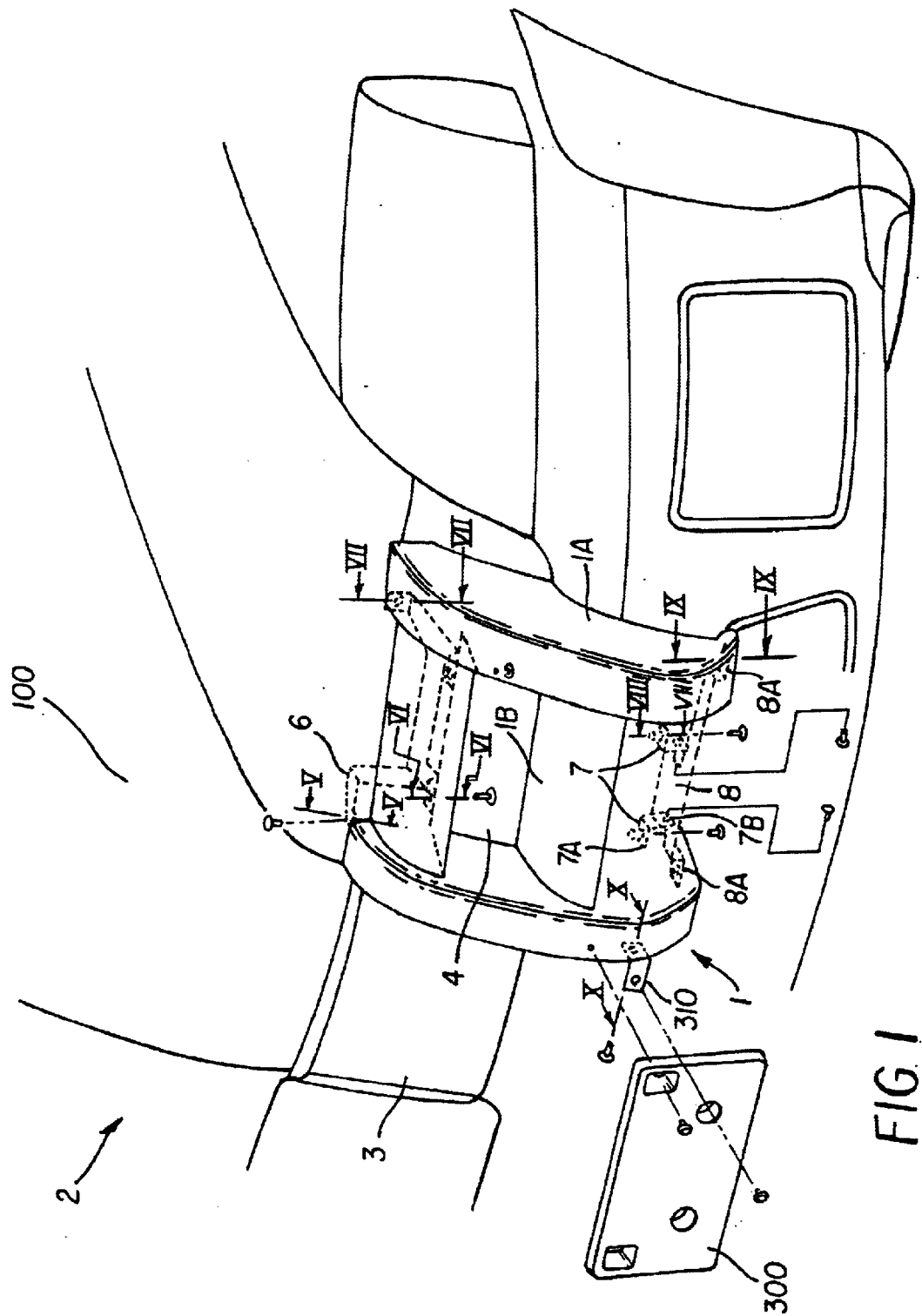
FIG. 1 is an assembly drawing showing a front grille guard 1 according to an embodiment of the present invention.

FIG. 1 is an assembly drawing showing a front grille guard 1 on the left side of a vehicle. The structure of the front grille guard 1 on the right side of the vehicle is identical with that of the front grille guard 1 on the left side of the vehicle, and a description thereof is omitted.

As shown in FIG. 1, a logo attaching part 3 where a logo or the like is attached is provided at substantially the center of the front face of a vehicle 2. First and second grilles 4 used for taking the air into an engine room are provided adjacent to the logo attachment part 3 (in the illustrated embodiment between the attaching part 3 and a headlamp assembly). Note that only the first grille 4 is shown in FIG. 1.

The first and second grilles 4 are respectively provided with the front grill guards 1, which are mounted at the right and left independently of each other adjacent to the logo attachment part 3 such that they do not cover the logo attachment part 3. Note that the front grill guard 1 on the left side is shown in FIG. 1. The front grille guard 1 is comprised of a pair of right and left longitudinal members 1A and a lateral member 1B that connects the pair of longitudinal members 1A to each other. The front grille guard 1 is shaped along the front face of the vehicle such that it does not protrude forward considerably in the direction of the length of the vehicle. The lateral member 1B is shaped according to the number of rectifiers 5 provided in the grille 4 in order to prevent the volume of air taken through the (first) grill 4 from being considerably decreased by the attachment of the front grille guard 1.

Figure 2:
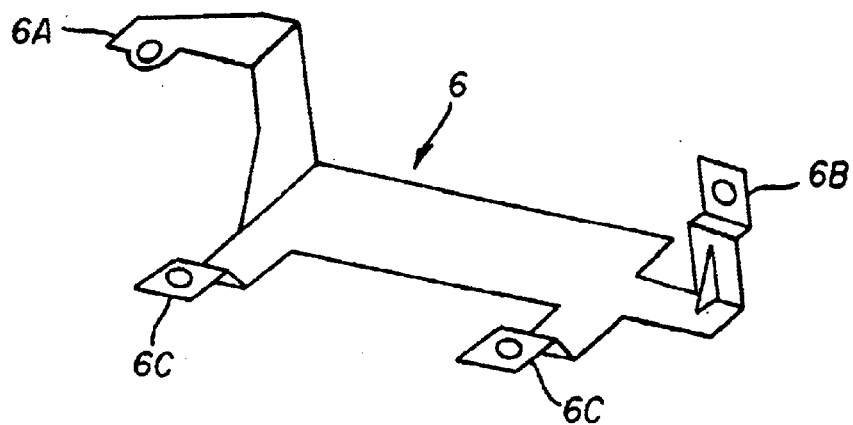
FIG. 2 is a perspective view showing an upper mounting member 6.
Figure 3:
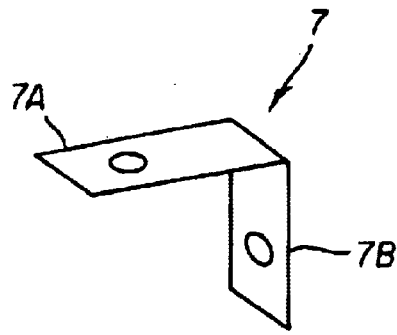
FIG. 3 is a perspective view showing a lower mounting member 7.

FIGS. 2 and 3 illustrate an upper mounting member 6 and a lower mounting member 7, respectively, which are mounted on a vehicle body and are used to mount the front grille guard 1 on the front face of the vehicle.

As shown in FIG. 2, the upper mounting member 6 is comprised of first and second mounting parts 6A and 6B, which are to be mounted at the right and left on a vehicle body member. In the illustrated embodiment, the second mounting part 6B is a separate part that is welded to the mounting member 6, although the part could also be formed by bending a portion of the mounting member 6. A pair of third mounting parts 6C, which is to be fastened on the upper lateral member 1B in the upper part of the front grille guard 1, is provided at the front of the upper mounting member 6 in the direction of the length of the vehicle.

Figure 5:
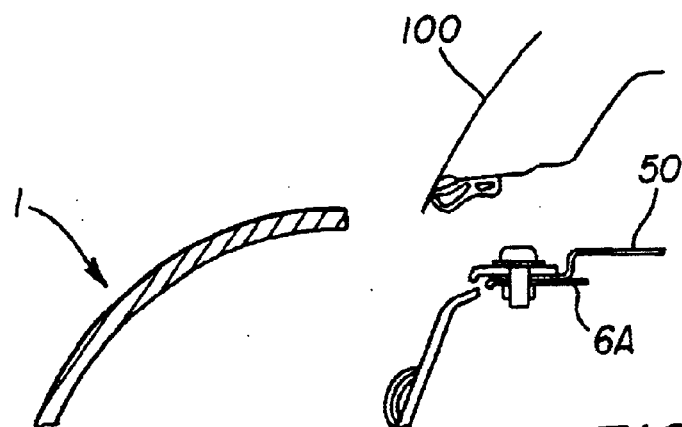
FIG. 5 is a view taken on arrow V—V of FIG. 1.
Figure 6:
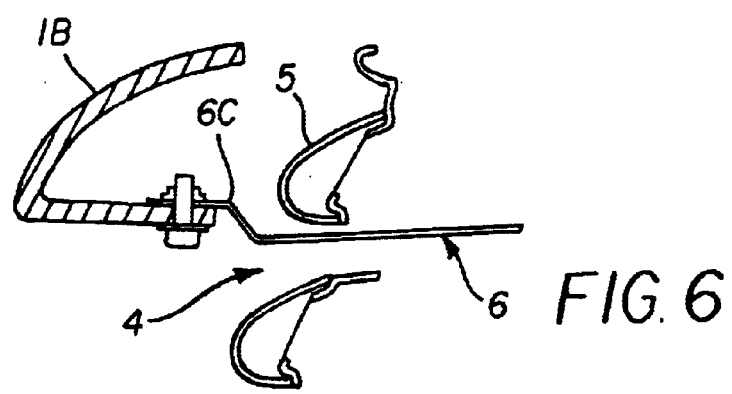
FIG. 6 is a view taken on arrow VI—VI of FIG. 1.
Figure 7:
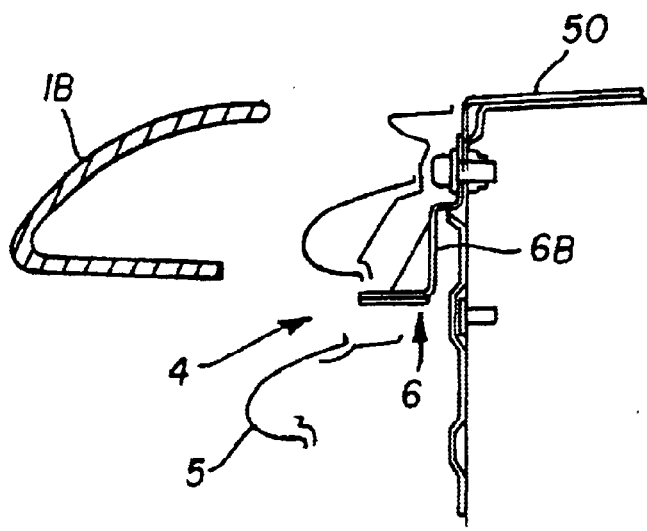
FIG. 7 is a view taken on arrow VII—VII of FIG. 1.

A description will now be given of the state in which the mounting parts 6A, 6B, and 6C of the upper mounting member 6 are mounted on the vehicle body. The first mounting part 6A is horizontally fastened on a vehicle body member 50 located below a hood 100 with a bolt as shown in FIG. 5. The second mounting part 6B is vertically fastened on the vehicle body member 50 with a bolt as shown in FIG. 7. The pair of third mounting parts 6C is inserted between the rectifiers 5 of the grill 4 to protrude forward in the direction of the length of the vehicle, and is fastened on the lateral member 1B in the upper part of the front grille guard 1 with a bolt as shown in FIG. 6.

As shown in FIG. 3, the lower mounting member 7 is substantially L-shaped, and is comprised of a first mounting part 7A at one end thereof and a second mounting part 7B at the other end thereof. The first mounting part 7A is to be mounted on a lower surface of a bumper 110, and the second mounting part 7B is to be mounted on a support member 8, which is provided in the lower part of the front grille guard 1 such that it extends between the longitudinal members 1A.

Figure 8:
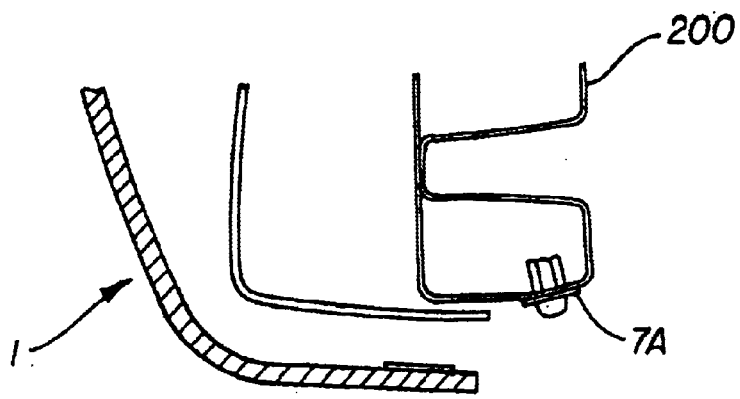
FIG. 8 is a view taken on arrow VIII—VIII of FIG. 1.

A description will now be given of the state in which the mounting parts 7A, 7B, and 7C of the lower mounting member 7 are mounted on the vehicle body. The first mounting part 7A is fastened on a lower surface of a bumper 200 with a bolt as shown in FIG. 8. The second mounting part 7B is fastened on fastening parts 8B of the support member 8, described later, with a bolt as shown in FIG. 1.

Figure 4:
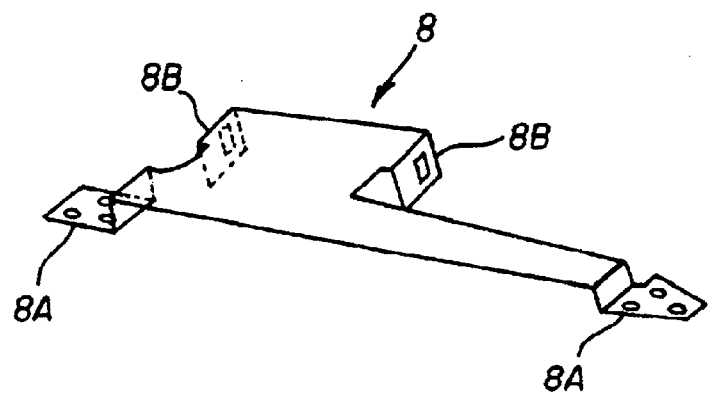
FIG. 4 is a perspective view showing a support member 8.
Figure 9:
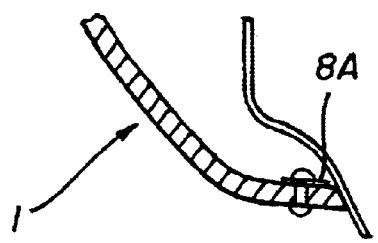
FIG. 9 is a view taken on arrow IX—IX of FIG. 1.

As shown in FIG. 4, the support member 8 is comprised of fastening parts 8A, which are respectively fastened on the longitudinal members 1A provided at both sides of the front grille guard 1 such that the support member 8 extends between the longitudinal members 1A. The fastening parts 8A are fastened on the lower part of the longitudinal members 1A with rivets as shown in FIG. 9. As shown in FIG. 4, the support member 8 is further comprised of the pair of fixing parts 8B, which are adapted to protrude rearward in the direction of the length of the vehicle and are to be mounted on the second mounting part 7B of the lower mounting member 7. As mentioned above, the fastening parts 8B are fastened on the second mounting part 7B of the lower mounting member 7 with bolts.

Figure 10:
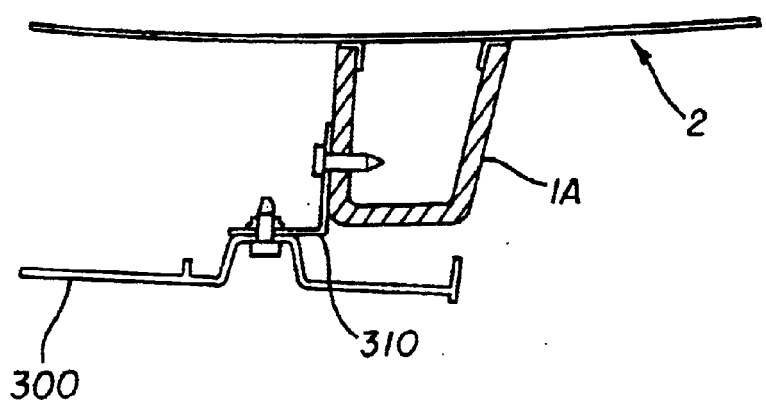
FIG. 10 is a view taken on arrow X—X of FIG. 1.
Figure 11:
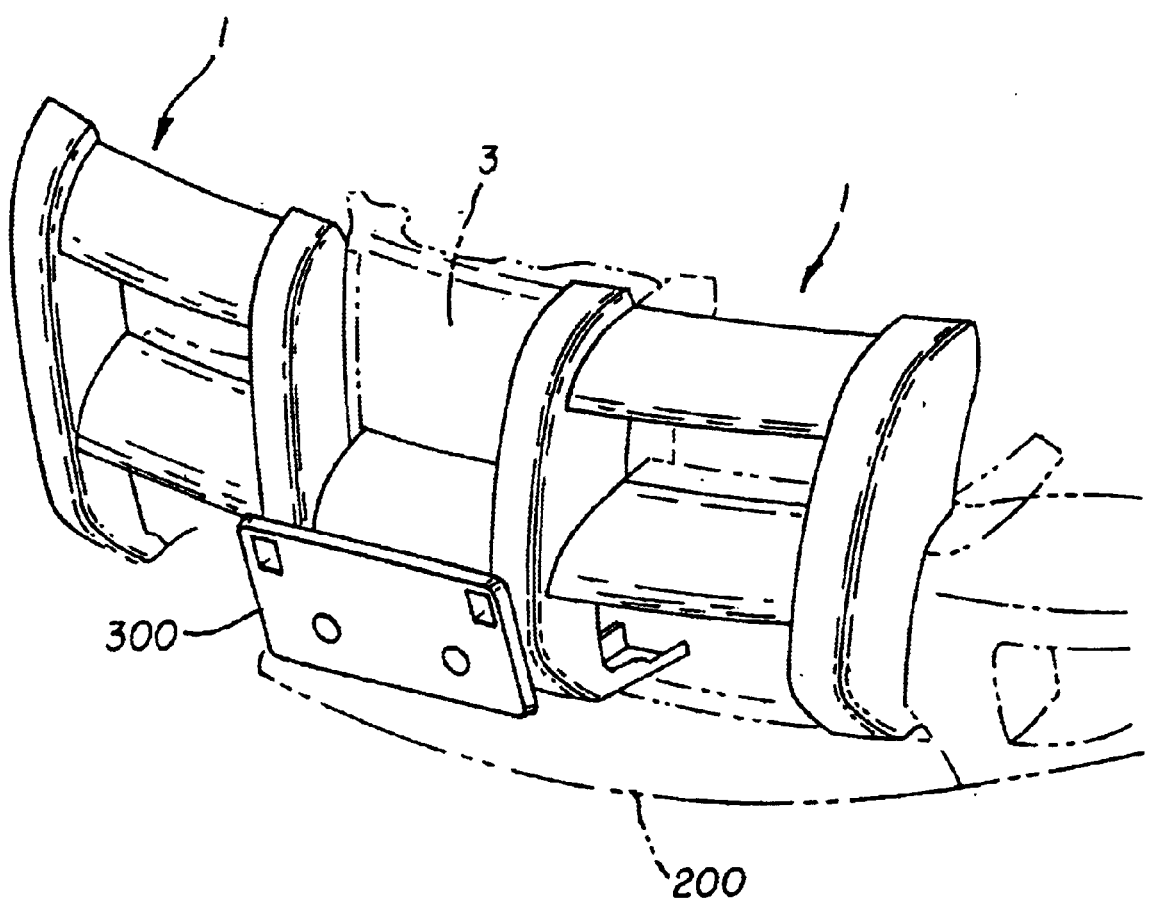
FIG. 11 is a front view of a vehicle with two grille guards installed.

A number plate 300 (plate member) is attached to the right and left front grille guards 1 such that the member plate 300 extends between the right and left front grille guards 1. The number plate 300 is attached to the longitudinal member 1A via a substantially L-shaped mounting bracket 310 as shown in FIG. 10. The mounting bracket 310 has one end thereof fastened on the longitudinal member 1A and the other end thereof fastened on the number plate 300 with respective bolts.

With the above described arrangement, the front grill guards 1 according to the embodiment of the present invention are capable of being mounted on the front face of the vehicle while ensuring the visibility of the logo attachment part 3 without covering the logo attachment part 3. Further, this design allows separate left and right grille guards 1, the installation of which might reduce repair costs after, for example, an offset collision.

It is to be understood, however, that there is no intention to limit the invention to the above described embodiment, but certain changes and modifications may be possible within the scope of the appended claims. For example, although in the above described embodiment, the front grill guards 1 are adapted to cover only the grilles 4, the present invention is not limited to this, but the front grille guards 1 may be adapted to extend to the sides of the vehicle so that they can cover head lamps and the periphery thereof. Namely, the front grille guards 1 may have any structures insofar as the right and left front grille guards 1 are formed independently of each other across the logo attachment part 3.

Further, although in the above described embodiment, the logo attachment part 3 is provided in a specified area formed by dividing the grille 4, the present invention is not limited to this, but the logo attachment part 3 may be provided in an area that is formed at the center of one grille extending in the direction of the width of the vehicle without dividing the grille.

What is claimed is:

1. A front grille guard structure for a vehicle that has a left-side grille and a right-side grill and a logo attachment part provided between the left-side and right-side grills, said front grille guard structure comprising:
a first grille guard for positioning in front of the left-side grill;
a second grille guard for positioning in front of the right-side grill;
a first mounting member for mounting the first grill guard to a front body member of the vehicle, the first mounting member being configured to extend through the left-side grill; and
a second mounting member for mounting the second grill guard to the front body member of the vehicle, the second mounting member being configured to extend through the right-side grill,
wherein said first and second grille guards mount to the front body member of the vehicle independently of each other, to the right and to the left, respectively, of said logo attachment part.

2. A front grille guard structure according to claim 1, wherein the first and second grille guards permit air to be taken into an engine compartment of the vehicle from the front of the vehicle through the right-side and left-side grilles provided to the right and left, respectively, of the logo attachment part.

3. A front grille guard structure according to claim 2, wherein said grille guards mount to both the front body member and a front bumper of the vehicle.

4. A front grille guard structure according to claim 1, wherein said grille guards each comprise a pair of longitudinal members and at least one lateral member that connects said pair of longitudinal members to each other.

5. A front grille guard structure according to claim 4, further comprising a support member fixed to said pair of longitudinal members such that said support member extends between said pair of longitudinal members for each of the grille guards.

6. A front grille guard structure for a vehicle that has a left-side grille and a right-side grill and a logo attachment part provided between the left-side and right-side grills, said front grille guard structure comprising:
a first grille guard for positioning in front of the left-side grill and a second grille guard for positioning in front of the right-side grill, wherein said first and second grille guards each include a pair of longitudinal members and at least one lateral member that connects said pair of longitudinal members to each other;
a support member fixed to said pair of longitudinal members such that said support member extends between said pair of longitudinal members for each of the grille guards,
wherein said first and second grille guards mount to front portions of the vehicle independently of each other, to the right and to the left, respectively of said logo attachment part;
an upper mounting member for fastening the lateral member of one of the first and second grille guards to an upper part of the vehicle; and
a lower mounting member for fastening one of the support members to a front bumper of the vehicle.

7. A front grille guard structure for a vehicle that has a logo attachment part, said front grille guard structure comprising:
a first grille guard;
a second grille guard; and
a plate member mounted to a lower pen of each of said first and second grille guards such that said plate member extends between said first and second grille guards,
wherein said first and second grille guards mount independently of each other, to the right and to the left, respectively, of said logo attachment part.

8. A front grille guard structure for a vehicle that has a left-side grille and a right-side grill and a logo attachment part provided between the left-side and right-side grills, said front grille guard structure comprising:
a first grille guard for positioning in front of the left-side grill;

a second grille guard for positioning in front of the right-side grille; and a plate member mounted to a lower part of each of said first and second grille guards such that said plate member extends between said first and second grille guards, wherein said first and second grille guards mount to front portions of the vehicle independently of each other, to the right and to the left, respectively, of said logo attachment part.

9. A vehicle comprising:

a left-side grille;

a right-side grill;

a logo attachment part provided between the left-side and right-side grills; and a front grille guard structure comprising:

a first grille guard positioned in front of the left-side grill;

a second grille guard positioned in front of the right-side grill;

a first mounting member mounting the first grill guard to a front body member of the vehicle, the first mounting member extending through the left-side grill; and a second mounting member mounting the second grill guard to the front body member of the vehicle, the second mounting member extending through the right-side grill, wherein the first and second grille guards are mounted to the front body member of the vehicle independently of each other, to the right and to the left, respectively, of the logo attachment part.

\* \* \* \* \*